US012631323B1

(12) United States Patent
Wan et al.

(10) Patent No.: US 12,631,323 B1
(45) Date of Patent: May 19, 2026

(54) SWIMMING POOL FOUNTAIN LAMP

(71) Applicant: SHENZHEN COOTWAY TECHNOLOGY CO., LTD., Shenzhen (CN)

(72) Inventors: Gangbin Wan, Sichuan Province (CN); Jianliang Xiong, Fuzhou City (CN)

(73) Assignee: SHENZHEN COOTWAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/371,576

(22) Filed: Oct. 28, 2025

(51) Int. Cl.

| | |
|---|---|
| ***F21V 33/00*** | (2006.01) |
| ***F21S 9/02*** | (2006.01) |
| ***F21V 31/00*** | (2006.01) |
| ***F21Y 113/00*** | (2016.01) |
| ***F21Y 115/10*** | (2016.01) |

(52) U.S. Cl.
CPC .............. *F21V 33/008* (2013.01); *F21S 9/02* (2013.01); *F21V 31/005* (2013.01); *F21Y 2113/00* (2013.01); *F21Y 2115/10* (2016.08)

(58) Field of Classification Search
CPC ........ F21V 33/008; F21V 31/005; F21S 9/02; F21Y 2113/00; F21Y 2115/10
See application file for complete search history.

(56) References Cited

U.S. PATENT DOCUMENTS

| | | | | |
|---|---|---|---|---|
| 7,316,359 | B2 * | 1/2008 | Beidokhti | F21V 29/51 239/18 |
| 11,118,745 | B2 * | 9/2021 | Zheng | F21V 29/70 |
| 2007/0037470 | A1 * | 2/2007 | Rothan | A63H 33/22 446/176 |
| 2008/0277493 | A1 * | 11/2008 | Liao | F21S 8/00 239/20 |
| 2017/0225186 | A1 * | 8/2017 | Ferguson | B05B 17/08 |
| 2021/0102543 | A1 * | 4/2021 | Reeves-Jackson | F04D 29/406 |

* cited by examiner

*Primary Examiner* — Tsion Tumebo

(57) ABSTRACT

The swimming pool fountain lamp includes a main body, a water spraying structure and a light emitting structure. The water spraying structure and the light emitting structure are both arranged in the main body. The water spraying structure sprays water in the main body to the outside of the main body. The light emitting structure is configured for illuminating a water column and a swimming pool. The water spraying structure sprays water in the main body to the outside of the main body. Light emitted by the light emitting structure is transmitted to the outside of the main body through an upper housing and a lower housing, illuminating the water column sprayed from the main body and the swimming pool. The water spraying structure sucks water in the swimming pool into the main body and sprays water out of the main body through an internal structure of the main body.

18 Claims, 8 Drawing Sheets

SWIMMING POOL FOUNTAIN LAMP

TECHNICAL FIELD

The present invention relates to the field of lamps, and in particular to a swimming pool fountain lamp.

BACKGROUND ART

In order to meet the lighting requirements at night and create an elegant, refined and dreamlike ambiance, a SPA pool, an above-ground pool, an underground pool, a fish pond and a fish pool usually select a pool lamp for water surface lighting or underwater lighting. The swimming pool lamp mainly includes a fixed swimming pool lamp mounted on a swimming pool wall or a swimming pool bottom, and a movable swimming pool lamp floating on the water surface. However, the existing swimming pool lamp has only a lighting function and cannot combine the water spraying function and the lighting function.

SUMMARY

In order to overcome the shortcomings of the prior art, the present disclosure provides a swimming pool fountain lamp. The swimming pool fountain lamp includes a main body, a water spraying structure and a light emitting structure. The water spraying structure and the light emitting structure are both arranged in the main body. The water spraying structure sprays water in the main body outside the main body. The light emitting structure is configured for illuminating the water column and the swimming pool.

As an improvement of the present disclosure, the main body includes an upper housing and a lower housing. The upper housing covers the lower housing, forming a second cavity. The light emitting structure is arranged in the second cavity. A first waterproof ring is provided at a connection between the upper housing and the lower housing.

As an improvement of the present disclosure, the upper housing defines a first groove. The first groove is internally provided with a first annular baffle and a second annular baffle. A second groove is formed between the first annular baffle and the second annular baffle. An inner wall of the first groove further defines a third groove. The first groove defines a first notch at a position corresponding to the third groove.

As an improvement of the present disclosure, a bottom portion of the upper housing is provided with a first sleeving tube, and the first sleeving tube is hollow. The first groove defines a first through hole at a position corresponding to the first sleeving tube. A first end of the first sleeving tube is in communication with the first through hole. A first sleeving member is sleeved on the first sleeving tube, and a sealing ring is sleeved on the first sleeving member.

As an improvement of the present disclosure, the lower housing is provided with a third annular baffle and a fourth annular baffle. A fourth groove is formed between the third annular baffle and the fourth annular baffle. The lower housing is further provided with a fifth annular baffle and a sixth annular baffle. A fifth groove is formed between the fifth annular baffle and the fourth annular baffle. A sixth groove is formed between the sixth annular baffle and the fifth annular baffle. A first annular step surface is provided on an inner wall of the fifth annular baffle. A second through hole is defined at a bottom portion of the lower housing. The sixth annular baffle is positioned on a first side of the second through hole.

As an improvement of the present disclosure, the first sleeving tube includes a first connecting tube and a second connecting tube. A first end of the first connecting tube is in communication with the first through hole. A second end of the first connecting tube is connected to the second connecting tube. The first sleeving member is sleeved on the second connecting tube and is arranged in the sixth groove. A first sealing gasket is arranged in the sixth groove, and the first sealing gasket abuts against the second connecting tube. A filtering screen is arranged on the sixth annular baffle, and the filtering screen abuts against the second connecting tube.

As an improvement of the present disclosure, the fourth groove is provided with a counterweight block and a foam. The foam and the counterweight are sequentially placed in the fourth groove. The counterweight abuts against the foam.

As an improvement of the present disclosure, the light emitting structure includes a control board and a fixing support. The control board is connected to the fixing support. The fixing support defines a third through hole at a position corresponding to the first sleeving tube. The fixing support is sleeved on the first sleeving tube. A plurality of LED (light emitting Diode) lamps are arranged on the control board. The plurality of LED lamps are electrically connected to the control board respectively. A thirteenth through hole is defined on the fixing support at a position corresponding to each of the LED lamps. A first end of the LED lamp is connected to the control board, and a second end of the LED lamp passes through the thirteenth through hole and is arranged outside the fixing support.

As an improvement of the present disclosure, a first battery and a second battery are arranged corresponding to each other in the second cavity. A first fixing member and a second fixing member are arranged corresponding to each other on the fixing support. A fourth through hole is defined on the control board at a position corresponding to the first fixing member. A first end of the first battery passes through the fourth through hole and is engaged with the first fixing member. The control board defines a fifth through hole at a position corresponding to the second fixing member. A first end of the second battery passes through the fifth through hole and is engaged with the second fixing member.

As an improvement of the present disclosure, a sixth through hole is defined on the control board. The fourth through hole, the fifth through hole, and the six through hole are all in communication. The first connecting tube passes through the third through hole and the sixth through hole and is connected to the second connecting tube.

As an improvement of the present disclosure, a power supply terminal is further provided in the second cavity. The power supply terminal is electrically connected to the control board. A seventh through hole is defined on the upper housing at a position corresponding to the power supply terminal. A silicone plug is provided in the seventh through hole. A first end of the silicone plug is arranged in the seventh through hole, and a second end of the silicone plug is arranged in the third groove.

As an improvement of the present disclosure, a button is provided on the control board. An eighth through hole is defined on the fixing support at a position corresponding to the button. A button pressing member is provided in the eighth through hole. The button pressing member is arranged above the button and connected to the upper housing. The upper housing defines a fourteenth through hole at a position corresponding to the button pressing member. A silicone sleeve is provided in the fourteenth through hole, and the silicone sleeve is sleeved on the button pressing member.

As an improvement of the present disclosure, the water spraying structure includes a motor upper housing, a motor cover and a motor. The motor upper housing covers the motor cover. The motor is arranged in the motor upper housing. The motor upper housing includes a first housing, a second housing and a third sleeving tube. The second housing and the third sleeving tube are respectively connected to the first housing.

As an improvement of the present disclosure, a plurality of first positioning columns are arranged circumferentially in the second housing. A plurality of second positioning columns are arranged circumferentially in the first groove. The first positioning columns are positioned corresponding to the second positioning columns. A ninth through hole is defined on the second housing at a position corresponding to the first positioning column.

As an improvement of the present disclosure, the first housing is provided with a seventh annular baffle. The seventh annular baffle is arranged on a first side of the third sleeving tube. A motor housing sealing gasket is provided in the second groove. The seventh annular baffle is arranged in the second groove and abuts against the motor housing sealing gasket.

As an improvement of the present disclosure, the third sleeving tube is arranged in the first connecting tube. The motor is arranged in the third sleeving tube. A plurality of tenth through holes are defined circumferentially around on the first housing, and the tenth through holes are in communication with the first connecting tube.

As an improvement of the present disclosure, a motor sealing gasket is provided in the third sleeving tube. A first end of the motor sealing gasket abuts against the motor, and a second end of the motor sealing gasket abuts against the motor cover. The motor sealing gasket is provided with a protruding member. The motor cover defines an eleventh through hole. A first end of the protruding member passes through the eleventh through hole and is arranged in the first connecting tube.

As an improvement of the present disclosure, a twelfth through hole is defined on the protruding member. A first end of a motor shaft of the motor passes through the twelfth through hole and is arranged in the first connecting tube; The motor shaft of the motor is connected to a fan blade, and the fan blade is provided in the first connecting tube.

As an improvement of the present disclosure, the motor cover is provided at a bottom portion of the third sleeving tube and is connected with the third sleeving tube via threads. The second housing is provided with a PET (Polyethylene Terephthalate) sheet.

As an improvement of the present disclosure, both the upper housing and the lower housing are made of a light-transmitting material. Polygon patterns are provided on an inner wall of the lower housing.

The present disclosure has the following beneficial effects. The present disclosure provides a swimming pool fountain lamp, including a main body, a water spraying structure and a light emitting structure. The water spraying structure and the light emitting structure are both arranged in the main body. The water spraying structure sprays water in the main body to the outside of the main body. The light emitted by the light emitting structure is transmitted to the outside of the main body through the upper housing and the lower housing, and the light is configured for illuminating the water column sprayed from the main body and the swimming pool. The water spraying structure sprays water sucks water in the swimming pool into the main body and sprays water out of the main body through an internal structure of the main body. Therefore, the fountain lamp is aesthetically pleasing.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
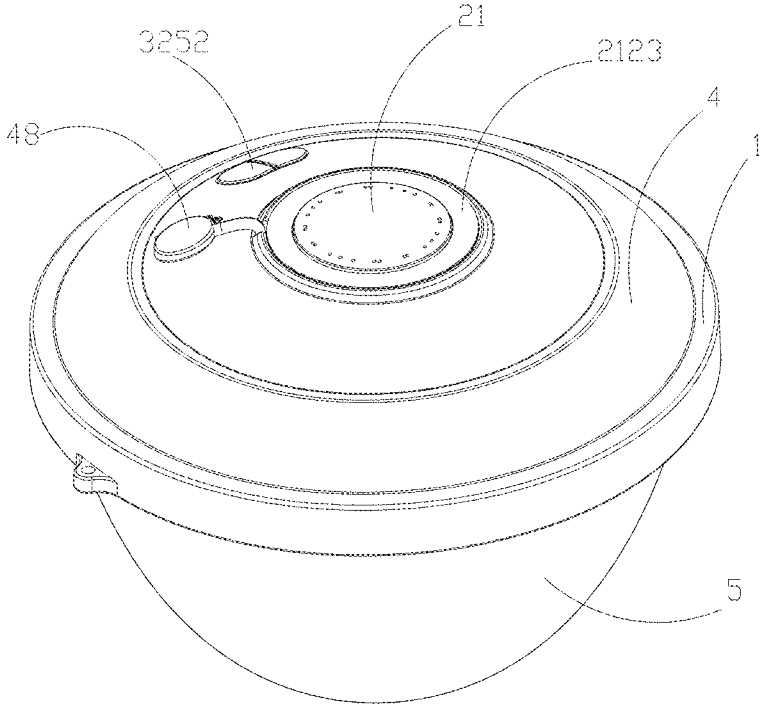
FIG. 1 is a structural schematic diagram of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
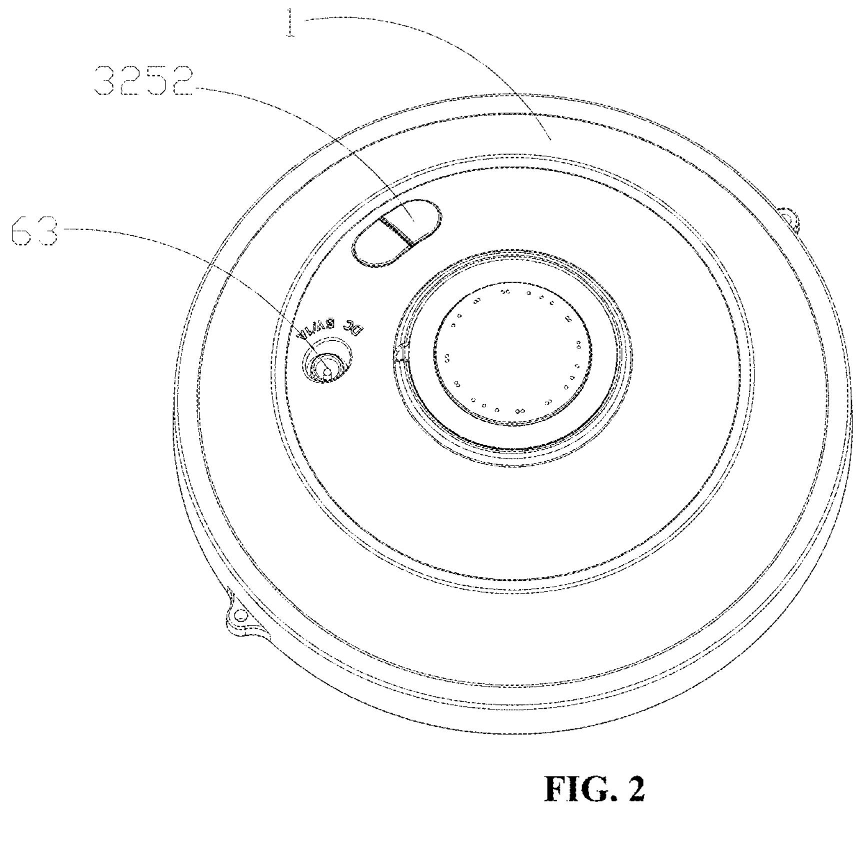
FIG. 2 is a structural schematic diagram of the present disclosure with out a silicone plug.
Figure 3:
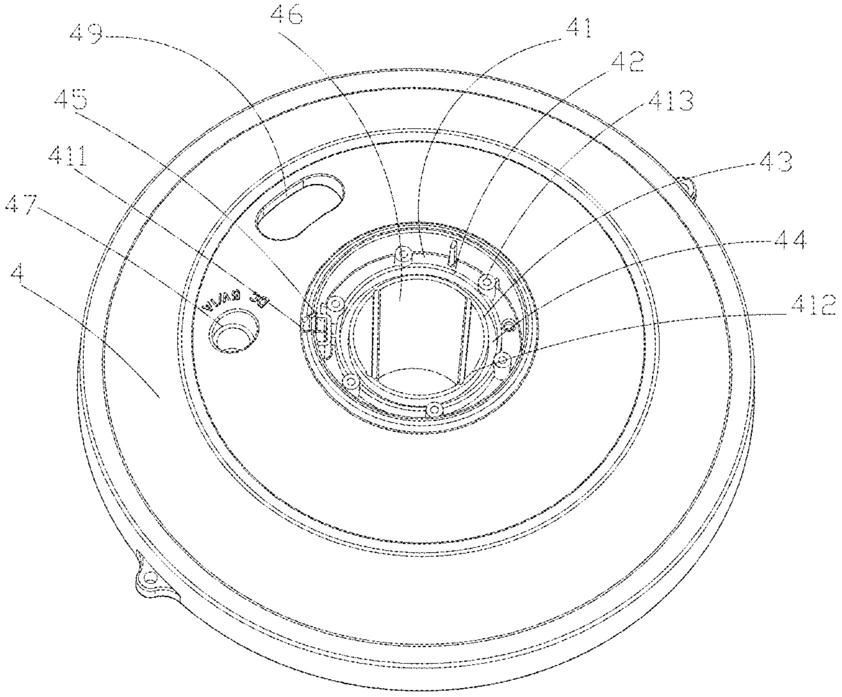
FIG. 3 is a structural schematic diagram of an upper housing of the present disclosure.
Figure 4:
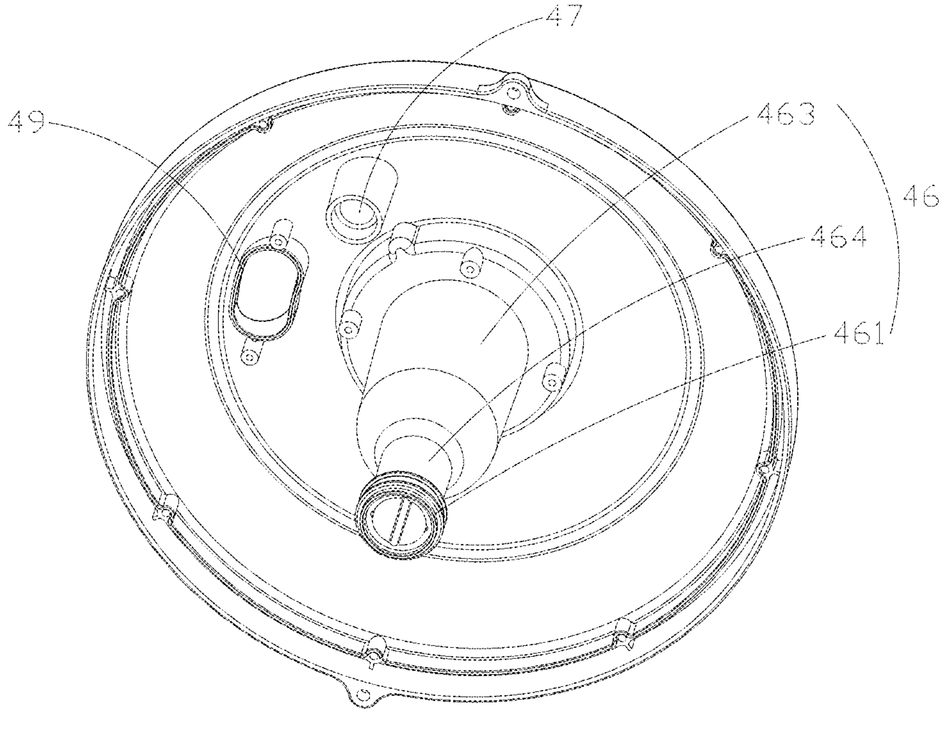
FIG. 4 is a structural schematic diagram of the upper housing of the present disclosure from another angle.
Figure 5:
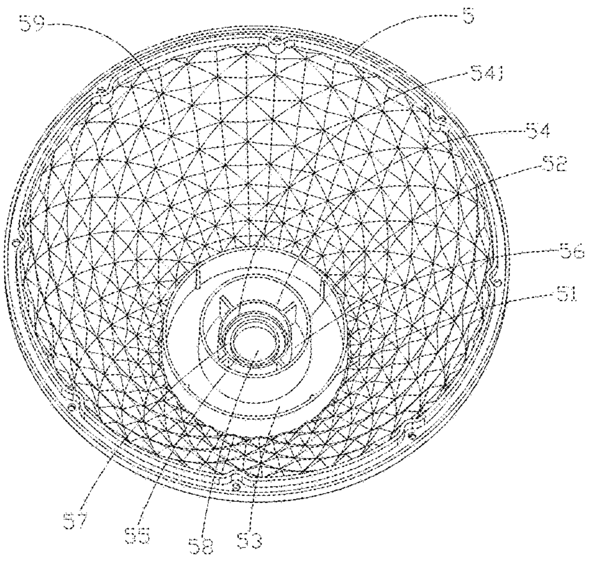
FIG. 5 is a structural schematic diagram of a lower housing of the present disclosure.
Figure 6:
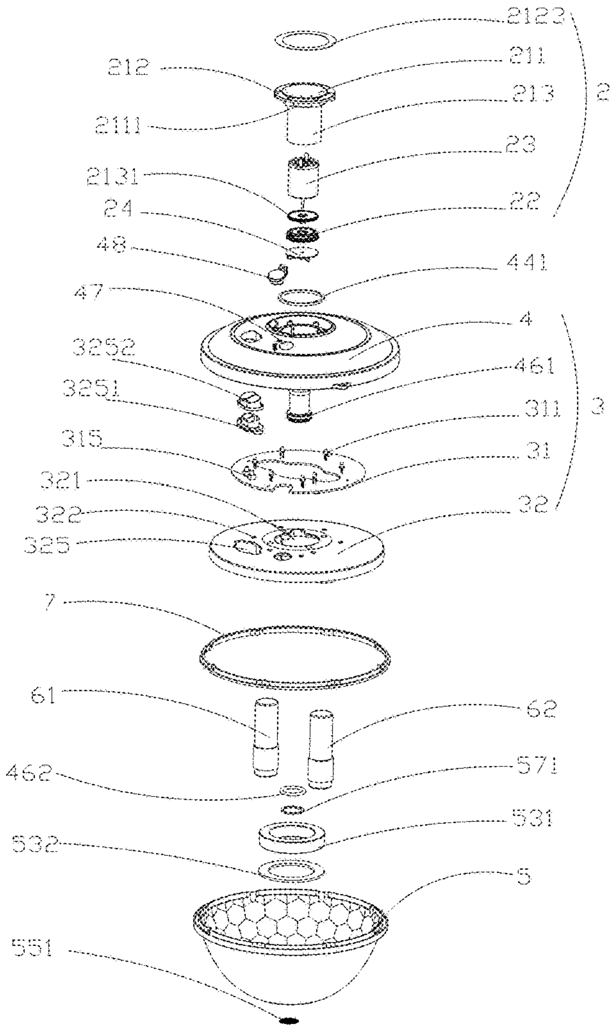
FIG. 6 is an exploded view of the present disclosure.
Figure 7:
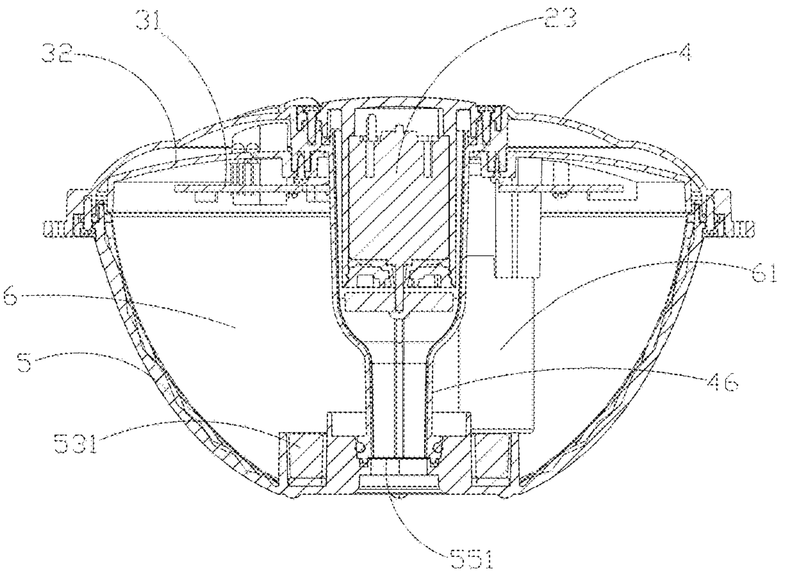
FIG. 7 is a cross-sectional view of the present disclosure.
Figure 8:
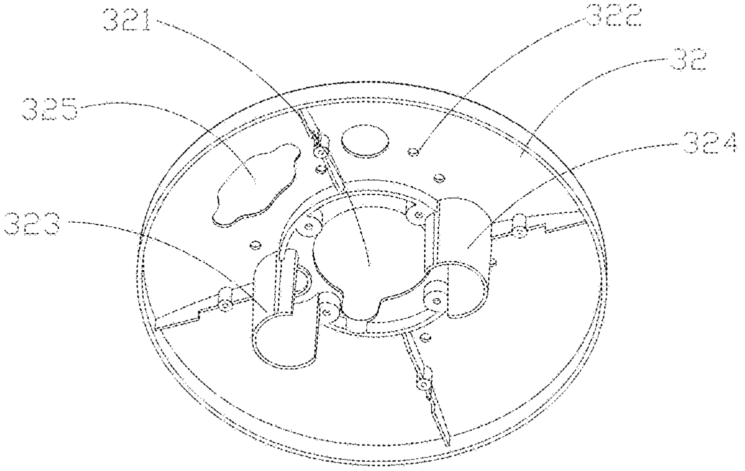
FIG. 8 is a structural schematic diagram of a fixing support of the present disclosure.
Figure 9:
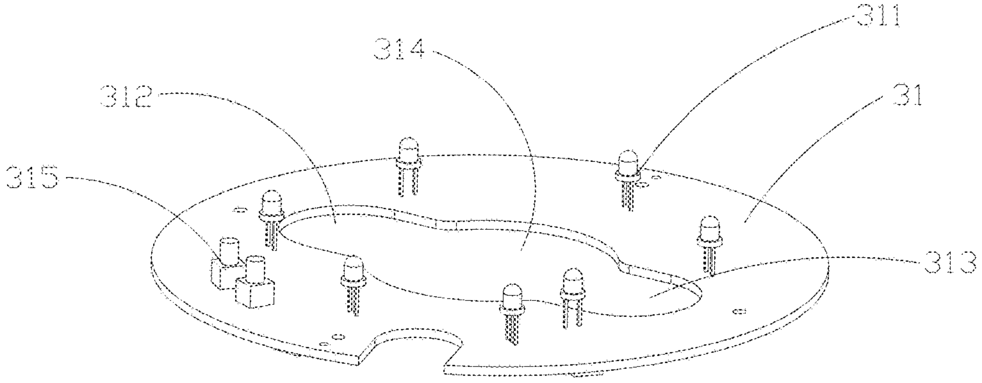
FIG. 9 is a structural schematic diagram of a control board according to the present disclosure.
Figure 10:
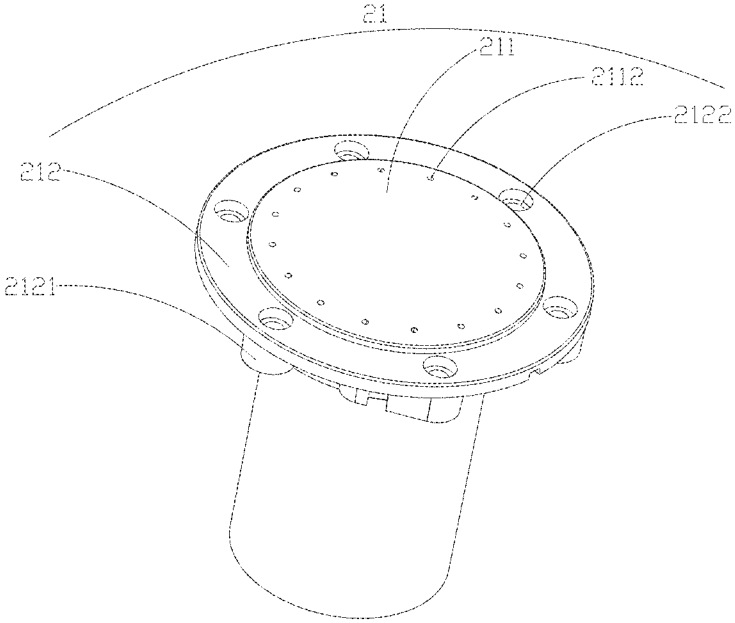
FIG. 10 is a structural schematic diagram of a motor upper housing according to the present disclosure.
Figure 11:
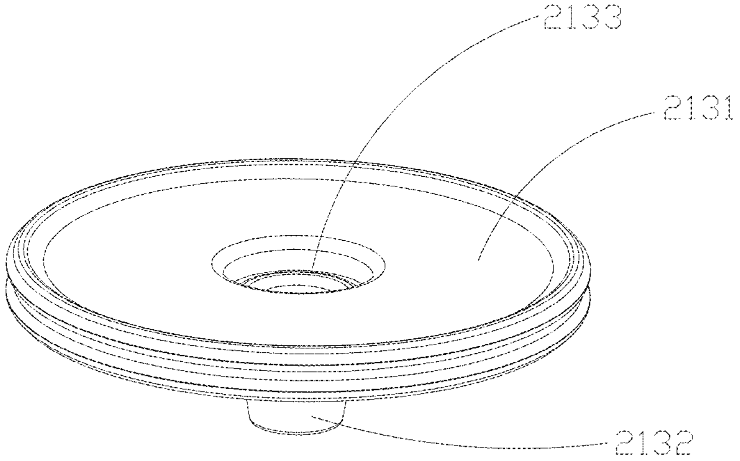
FIG. 11 is a structural schematic diagram of a motor sealing gasket of the present disclosure.
Figure 12:
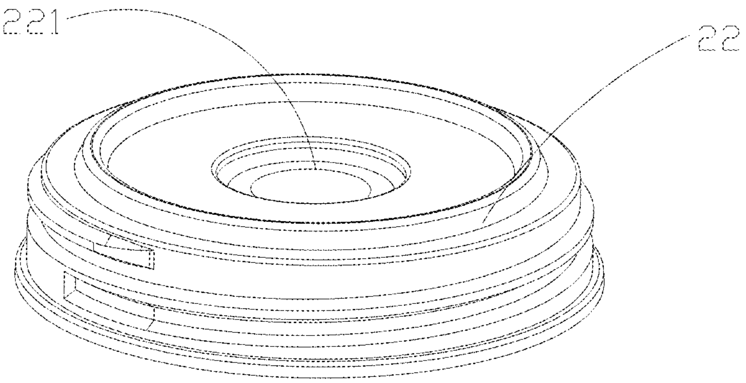
FIG. 12 is a structural schematic diagram of a motor cover of the present disclosure.
Figure 13:
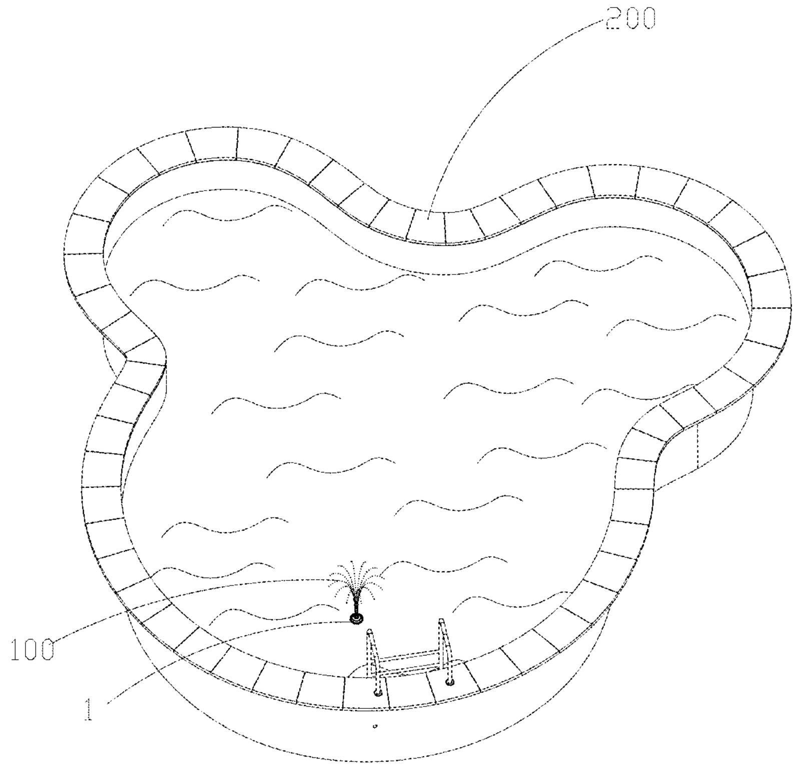
FIG. 13 is a scene application diagram of a swimming pool fountain lamp of the present disclosure.

Referring to FIG. 1 to FIG. 13, a swimming pool fountain lamp includes a main body 1, a water spraying structure 2, and a light emitting structure 3. The water spraying structure 2 and the light emitting structure 3 are both arranged in the main body 1. The water spraying structure 2 sprays water in the main body 1 to the outside of the main body 1. The light emitting structure 3 is configured for illuminating a water column 100 and a swimming pool 200. The water spraying structure 2 sprays water in the main body 1 to the outside of the main body 1. The light emitted by the light emitting structure 3 is transmitted to the outside of the main body 1 through an upper housing 4 and a lower housing 5 and illuminates the water column 100 ejected from the main body 1 and the swimming pool 200 outside the main body 1. The water spraying structure 2 sucks water in the swimming pool 200 into the main body 1 and sprays the water out of the main body 1 through an internal structure of the main body 1. Therefore, the fountain lamp is aesthetically pleasing.

In the present embodiment, the main body 1 includes the upper housing 4 and the lower housing 5. The upper housing 4 covers the lower housing 5, forming a second cavity 6. The light emitting structure 3 is arranged in the second cavity 6. A first waterproof ring 7 is provided at a connection between the upper housing 4 and the lower housing 5. The upper housing 4 covers the lower housing 5. The first waterproof ring 7 prevents the water in the swimming pool 200 from freely entering the main body 1, so that the water in the swimming pool 200 can only enter the main body 1 through a specific channel. The fountain lamp is placed in the swimming pool 200, and the water in the swimming pool 200 does not affect the device in the second cavity 6.

In the present embodiment, the upper housing 4 defines a first groove 41. The first groove 41 is internally provided with a first annular baffle 42 and a second annular baffle 43. A second groove 44 is formed between the first annular baffle 42 and the second annular baffle 43. An inner wall of the first groove 41 further defines a third groove 45. A first notch (411) is defined on the first groove 41 at a position corresponding to the third groove 45. The second cavity 6 is further provided with a power supply terminal 63, and the power supply terminal 63 is electrically connected to a control board 31. The upper housing 4 defines a seventh through hole 47 at a position corresponding to the power supply terminal 63. A silicone plug 48 is provided in the seventh through hole 47. A first end of the silicone plug 48 is arranged in the seventh through hole 47, and a second end of the silicone plug 48 is arranged in the third groove 45. The motor upper housing 21 positions the second end of the silicone plug 48 within the third groove 45. When the fountain lamp needs to be charged, the silicone plug 48 in the seventh through hole 47 can be removed, so that the power supply terminal 63 is exposed to charge the fountain lamp. The power supply terminal 63 is connected to an external power supply to charge a first battery 61 and a second battery 62.

In the present embodiment, a bottom portion of the upper housing 4 is provided with a first sleeving tube 46, and the first sleeving tube 46 is hollow. The first groove 41 defines a first through hole 412 at a position corresponding to the first sleeving tube 46. A first end of the first sleeving tube 46 is in communication with the first through hole 412. The first sleeving tube 46 is sleeved with a first sleeving member 461, and the first sleeving member 461 is sleeved with a sealing ring 462. The lower housing 5 is provided with a third annular baffle 51 and a fourth annular baffle 52. A fourth groove 53 is formed between the third annular baffle 51 and the fourth annular baffle 52. The lower housing 5 is further provided with a fifth annular baffle 54 and a sixth annular baffle 55. A fifth groove 56 is formed between the fifth annular baffle 54 and the fourth annular baffle 52. A sixth groove 57 is formed between the sixth annular baffle 55 and the fifth annular baffle 54. An inner wall of the fifth annular baffle 54 is provided with a first annular step surface 541. A bottom portion of the lower housing 5 defines a second through hole 58. The sixth annular baffle 55 is positioned on a first side of the second through hole 58.

In the present embodiment, the first sleeving tube 46 includes a first connecting tube 463 and a second connecting tube 464. A first end of the first connecting tube 463 is in communication with the first through hole 412. A second end of the first connecting tube 463 is connected to the second connecting tube 464. The first sleeving member 461 is sleeved on the second connecting tube 464 and is arranged in the sixth groove 57. The sixth groove 57 is internally provided with a first sealing gasket 571. The first sealing gasket 571 abuts against the second connecting tube 464. The sixth annular baffle 55 is provided with a filter screen 551, and the filter screen 551 abuts against the second connecting tube 464. The water in the swimming pool 200 passes through the filter screen 551 from the second through hole 58 and enters the second connecting tube 464 and the first connecting tube 463. The filter screen 551 filters impurities in the swimming pool 200, so that impurities is prevented from entering the second connecting tube 464. The first sealing gasket 571 and the sealing ring 462 seal the second connecting tube 464 to prevent water in the second connecting tube 464 from entering the second cavity 6. The second connecting tube 464 presses the filter screen 551 against a top portion of the sixth annular baffle 55.

In the present embodiment, the fourth groove 53 is internally provided with a counterweight block 531 and a foam 532. The foam 532 and the counterweight block 531 are sequentially placed in the fourth groove 53. The counterweight block 531 abuts against the foam 532. The foam 532 is arranged at a bottom portion of the fourth groove 53. The counterweight block 531 is arranged on the foam 532. The counterweight block 531 is arranged at a bottom portion of the main body 1 and a motor 23 is arranged at a top portion of the main body 1. The structure ensures that the weight distribution at the top portion and the bottom portion of the main body 1 is substantially equal, preventing the fountain lamp from tipping over.

In the present embodiment, the light emitting structure 3 includes a control board 31 and a fixing support 32. The control board 31 is connected to the fixing support 32. The fixing support 32 defines a third through hole 321 at a position corresponding to the first sleeving tube 46 and is provided with, and the fixing bracket 32 is sleeved on the first sleeving tube 46. A plurality of LED lamps 311 are provided on the control board 31. The plurality of LED lamps 311 are respectively electrically connected to the control board 31. The fixing support 32 defines a thirteenth through hole 322 at a position corresponding to each LED lamp 311. A first end of the LED lamp 311 is connected to the control board 31, and a second end of the LED lamp 311 passes through the thirteenth through hole 322 and is arranged outside the fixing support 32. The fixing support 32 is connected to the control board 31. The control board 31 controls the LED lamp 311 to work. Light of the LED lamp 311 is transmitted to the outside of the fountain lamp through the upper housing 4 and the lower housing 5. The LED lamp 311 can emit lights of different colors according to different requirements of the customer, so that the fountain lamp is more colorful.

In the present embodiment, the first battery 61 and the second battery 62 are arranged corresponding to each other in the second cavity 6. A first fixing member 323 and a second fixing member 324 are arranged corresponding to each other on the fixing support 32. A fourth through hole 312 is defined on the control board 31 at a position corresponding to the first fixing member 323. A first end of the first battery 61 passes through the fourth through hole 312 and is engaged with the first fixing member 323. The control board 31 defines a fifth through hole 313 at a position corresponding to the second fixing member 324. A first end of the second battery 62 passes through the fifth through hole 313 and is engaged with the second fixing member 324. The control board 31 defines a sixth through hole 314. The fourth through hole 312, the fifth through hole 313, and the sixth through hole 314 are in communication. The first connecting tube 463 passes through the third through hole 321 and the sixth through hole 314 and is connected to the second connecting tube 464. The first fixing member 323 fixes the first battery 61 in the second cavity 6. The second fixing member 324 fixes the second battery 62 in the second cavity 6. The first connecting tube 463 passes through the sixth through hole 314 and is connected to the second connecting tube 464, restricting positional misalignment of the first battery 61 and the second battery 62 in the second cavity 6.

In the present embodiment, a button 315 is provided on the control board 31. An eighth through hole 325 is defined on the fixing support 32 at a position corresponding to the button 315. A button pressing member 3251 is provided in the eighth through hole 325. The button pressing member 3251 is placed above the button 315 and is connected to the upper housing 4. The upper housing 4 defines a fourteenth through hole 49 at a position corresponding to the button pressing member 3251. A silicone sleeve 3252 is provided in the fourteenth through hole 49. The silicone sleeve 3252 is sleeved on the button pressing member 3251. The fountain lamp is opened or closed through the button 315. The silicone sleeve 3252 is provided on the button 315 to protect the button 315 from direct contact with water. A working mode and the light color of the LED lamp 311 can also be adjusted through the button 315.

In the present embodiment, the water spraying structure 2 includes a motor upper housing 21, a motor cover 22 and the motor 23. The motor upper housing 21 covers the motor cover 22, and the motor 23 is arranged in the motor upper housing 21. The motor upper housing 21 includes a first housing 211, a second housing 212, and a third sleeving tube 213. The second housing 212 and the third sleeving tube 213 are respectively connected to the first housing 211. The motor 23 is placed in the motor upper housing 21. The motor upper housing 21 and the motor cover 22 protect the motor 23, enclosing it within an independent space to enhance its water resistance. The motor can be a carbon brush or a brushless motor. The carbon brush motor has advantages of simple structure and low maintenance cost. The brushless motor has advantages of high efficiency, saving energy, and long service life. A power supply mode of the motor is to supply power through energy storage batteries. The energy storage battery is safe. The energy storage battery does not contain harmful heavy metal cadmium, reducing environmental pollution. Moreover, the chemical property of the energy storage battery is relatively stable, and is not prone to explosion under circumstances of overcharge or over discharge. The battery is charged through the DC 5V (Direct Current Five Volts).

In the present embodiment, a plurality of first positioning columns 2121 are arranged circumferentially on the second housing 212. A plurality of second positioning columns 413 are arranged circumferentially in the first grooves 41. Positions of the first positioning columns 2121 correspond to positions of the second positioning columns 413. The second housing 212 defines a ninth through hole 2122 at a position corresponding to the first positioning column 2121. The first positioning column 2121 and the second positioning column 413 fix the motor upper housing 21 in the first groove 41. A screw is inserted through the ninth through hole 2122 to lock the first positioning column 2121 and the second positioning column 413.

In the present embodiment, the first housing 211 is provided with a seventh annular baffle 2111. The seventh annular baffle 2111 is placed on a first side of the third sleeving tube 213. The second groove 44 is internally provided with a motor housing sealing gasket 441. The seventh annular baffle 2111 is arranged in the second groove 44 and abuts against the motor housing sealing gasket 441. The third sleeving tube 213 is arranged in the first connecting tube 463, and the motor 23 is arranged in the third sleeving tube 213. A plurality of tenth through holes 2112 are circumferentially defined on the first housing 211. The tenth through holes 2112 are in communication with the first connecting tubes 463. The seventh annular baffle 2111 is arranged in the second grooves 44. A bottom portion of the second grooves 44 is provided with the motor housing sealing gasket 441 to prevent water in the first connecting tube 463 from penetrating into the second cavity 6. The tenth through hole 2112 is in communication with the first connecting tube 463. And the water in the first connecting tube 463 sprays out of the main body 1 through the tenth through hole 2112 and forms the water column 100. The tenth through hole are water spray holes circumferentially arranged on the first housing 211. A total number of the tenth through hole is a range from 10-12. The water flow is sprayed out from the water spray hole. The plurality of water columns 100 form a fountain. A height of the water sprayed out from the water spray hole is in a range from 0.3 m-1.5 m, with better ornamental value.

In the present embodiment, a motor sealing gasket 2131 is provided in the third sleeving tube 213. A first end of the motor sealing gasket 2131 abuts against the motor 23, and a second end of the motor sealing gasket 2131 abuts against the motor cover 22, preventing the water in the first connecting tube 463 from entering the upper housing and affecting the motor 23. The motor sealing gasket 2131 is provided with a protruding member 2132. The motor cover 22 defines an eleventh through hole 221. A first end of the protruding member 2132 passes through the eleventh through hole 221 and is arranged in the first connecting tube 463. The protruding member 2132 defines a twelfth through hole 2133. A first end of a motor shaft of the motor 23 passes through the twelfth through hole 2133 and is arranged in the first connecting tube 463. The motor shaft of the motor 23 is connected to a fan blade 24. The fan blade 24 is arranged in the first connecting tube 463. The motor shaft drives the fan blade 24 to rotate, and the fan blade 24 drive the water in the first connecting tube 463 to rotate. Then the water sprays out of the first connecting tube 463 through the tenth through hole 2112 and forms the water column 100. The motor cover 22 is arranged at a bottom portion of the third sleeving tube 213 and is connected with the third sleeving tube 213 via threads. The second housing 212 is provided with a PET sheet 2123.

In the present embodiment, both the upper housing 4 and the lower housing 5 are made of a light-transmitting material. Polygon patterns 59 are provided on an inner wall of the lower housing 5. The upper housing 4 and the lower housing 5 transmit the light of the LED lamp 311 out of the fountain lamp. The light of the LED lamp 311 transmits through the upper housing 4 to irradiate on the water column 100, so that the emitted water column 100 is more vibrant. The light of the LED lamp 311 transmits out of the lower housing 5, so that the polygonal patterns 59 on the inner wall of the lower housing 5 can be transmitted out of the lower housing 5. The polygonal patterns 59 can be diamond shaped patterns or hexagonal patterns. When the LED lamps 311 irradiate the inner wall of the lower housing 5, through a rhombic or hexagonal refractive or convex lens optical principle, the light of the diamond shaped patterns or hexagonal patterns can be transmitted to the bottom of the swimming pool, making the swimming pool more vibrant. The bottom of the swimming pool is illuminated when the user enters the swimming pool. Moreover, the light of the LED lamp 311 is also transmitted into the swimming pool 200 to illuminate a bottom portion of the swimming pool 200.

Figure 14:
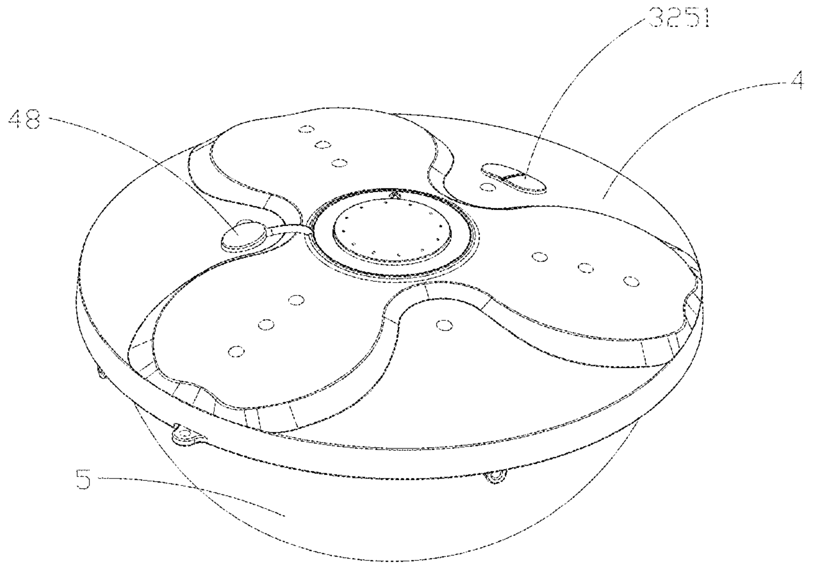
FIG. 14 is a structural schematic diagram of another embodiment of the present disclosure.
Figure 15:
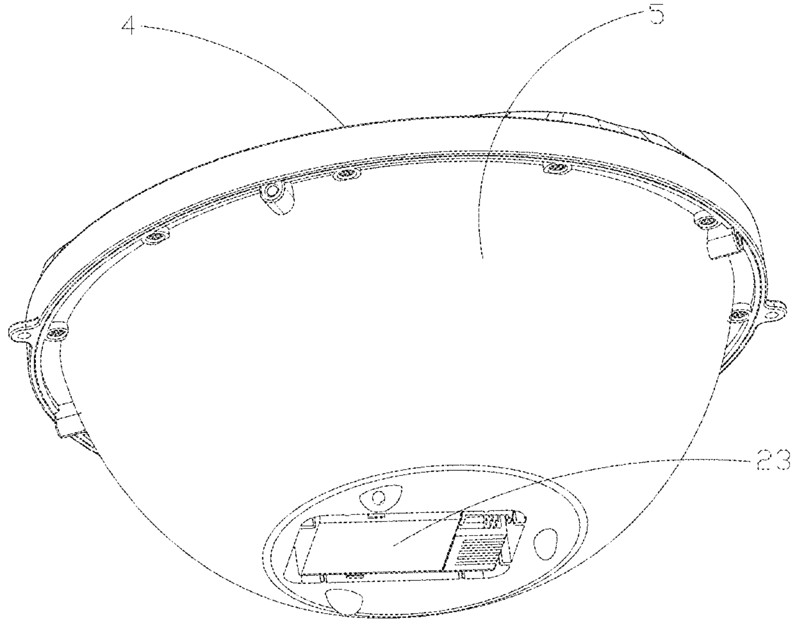
FIG. 15 is a structural schematic diagram of another embodiment of another angle according to the present disclosure.
Figure 16:
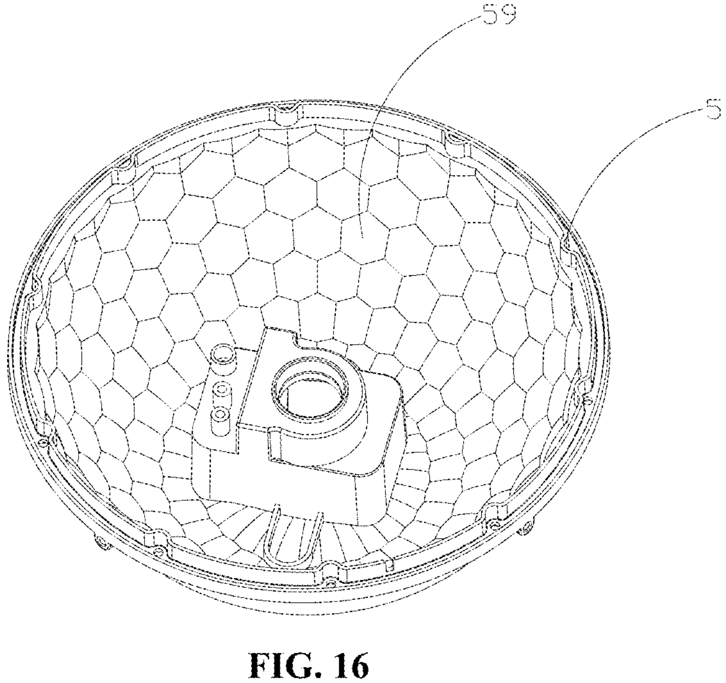
FIG. 16 is a structural schematic diagram of a lower housing according to another embodiment of the present disclosure.
Figure 17:
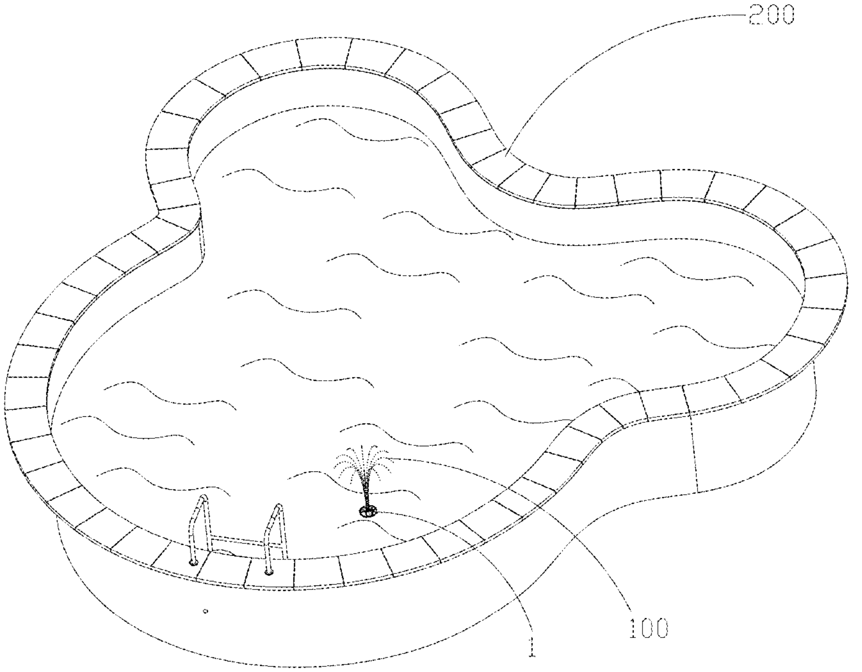
FIG. 17 is a scene application diagram of another embodiment of the present disclosure.

In another embodiment of the present invention, referring to FIG. 14 to FIG. 17, the motor 23 is a waterproof motor. The motor 23 can also be placed at the position of the second through hole 58 at the bottom portion of the lower housing 5. No filter screen 551 is provided on the sixth annular baffle 55. The filter screen 551 is arranged on a first side of the motor 23. A first end of the motor shaft of the motor 23 passes through the second through hole 58 and is arranged in the second connecting tube 464.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A swimming pool fountain lamp, comprising: a main body, a water spraying structure and a light emitting structure, wherein the water spraying structure and the light emitting structure are both arranged in the main body; the water spraying structure sprays water in the main body to the outside of the main body, and the light emitting structure is configured for illuminating a water column and the swimming pool;

wherein the main body comprises an upper housing and a lower housing, the upper housing covers the lower housing, forming a second cavity, the light emitting structure is arranged in the second cavity, and a first waterproof ring is provided at a connection between the upper housing and the lower housing;

wherein the upper housing defines a first groove, the first groove is internally provided with a first annular baffle and a second annular baffle, and a second groove is formed between the first annular baffle and the second annular baffle;

an inner wall of the first groove further defines a third groove, and a position of the first groove corresponding to the third groove defines a first notch.

2. The swimming pool fountain lamp according to claim 1, wherein a bottom portion of the upper housing is provided with a first sleeving tube, and the first sleeving tube is hollow; the first groove defines a first through hole at a position corresponding to the first sleeving tube, and a first end of the first sleeving tube is in communication with the first through hole; the first sleeving tube is sleeved with a first sleeving member, and a sealing ring is sleeved on the first sleeving member.

3. The swimming pool fountain lamp according to claim 2, wherein the lower housing is provided with a third annular baffle and a fourth annular baffle, and a fourth groove is formed between the third annular baffle and the fourth annular baffle; the lower housing is further provided with a fifth annular baffle and a sixth annular baffle, a fifth groove is formed between the fifth annular baffle and the fourth annular baffle, and a sixth groove is formed between the sixth annular baffle and the fifth annular baffle; an inner wall of the fifth annular baffle is provided with a first annular step surface; a bottom portion of the lower housing is provided with a second through hole, and the sixth annular baffle is positioned on a first side of the second through hole.

4. The swimming pool fountain lamp according to claim 3, wherein the first sleeving tube comprises a first connecting tube and a second connecting tube, a first end of the first connecting tube is in communication with the first through hole, and a second end of the first connecting tube is connected to the second connecting tube; the first sleeving member is sleeved on the second connecting tube and is arranged in the sixth groove; a first sealing gasket is provided in the sixth groove, and the first sealing gasket abuts against the second connecting tube; and the sixth annular baffle is provided with a filter screen, and the filter screen abuts against the second connecting tube.

5. The swimming pool fountain lamp according to claim 3, wherein a counterweight block and a foam are arranged in the fourth groove, the foam and the counterweight block are sequentially placed in the fourth groove, and the counterweight block abuts against the foam.

6. The swimming pool fountain lamp according to claim 2, wherein the light emitting structure comprises a control board and a fixing support, and the control board is connected to the fixing support; the fixing support defines a third through hole at a position corresponding to the first sleeving tube, and the fixing support is sleeved on the first sleeving tube; the control board is provided with a plurality of LED lamps, and the plurality of LED lamps are respectively electrically connected to the control board; thirteenth through holes are defined at positions of the fixing support corresponding to each of the LED lamps, a first end of the LED lamp is connected to the control board, and a second end of the LED lamp passes through the thirteenth through hole and is arranged outside the fixed support.

7. The swimming pool fountain lamp according to claim 6, wherein a first battery and a second battery are arranged opposite to each other in the second cavity, a first fixing member and a second fixing member are arranged opposite each other on the fixing support, a fourth through hole is defined on the control board at a position corresponding to the first fixing member, a first end of the first battery passes through the fourth through hole and is engaged in the first fixing member; the control board defines a fifth through hole at a position corresponding to the second fixing member, and a first end of the second battery passes through the fifth through hole and is engaged in the second fixing member.

8. The swimming pool fountain lamp according to claim 7, wherein a sixth through hole is defined on the control board, the fourth through hole, the fifth through hole, and the sixth through hole are all in communication; the first connecting tube passes through the third through hole and the sixth through hole and is connected to the second connecting tube.

9. The swimming pool fountain lamp according to claim 2, wherein a power supply terminal is further arranged in the second cavity, and the power supply terminal is electrically connected to the control board; the upper housing defines a seventh through hole at a position corresponding to the power supply terminal, a silicone plug is provided in the seventh through hole, a first end of the silicone plug is positioned in the seventh through hole, and a second end of the silicone plug is arranged in the third groove.

10. The swimming pool fountain lamp according to claim 6, wherein a button is provided on the control board, an eighth through hole is defined on the fixing support at a position corresponding to the button, a button pressing member is provided in the eighth through hole, and the button pressing member is arranged above the button and connected to the upper housing; the upper housing defines an fourteenth through hole at a position corresponding to the button pressing member, a silicone sleeve is provided in the fourteenth through hole, and the silicone sleeve is sleeved on the button pressing member.

11. The swimming pool fountain lamp according to claim 4, wherein the water spraying structure comprises a motor upper housing, a motor cover and a motor, the motor upper housing covers the motor cover, and the motor is arranged in the motor upper housing; the motor upper housing comprises a first housing, a second housing and a third sleeving tube, the second housing and the third sleeving tube are respectively connected to the first housing.

12. The swimming pool fountain lamp according to claim 11, wherein a plurality of first positioning columns are circumferentially arranged in the second housing, a plurality of second positioning columns are circumferentially arranged in the first grooves, and positions of the first positioning columns correspond to positions of the second positioning columns; and a ninth through hole is defined on the second housing at a position corresponding to the first positioning column.

13. The swimming pool fountain lamp according to claim 11, wherein a seventh annular baffle is arranged on the first housing, and the seventh annular baffle is arranged on a first side of the third sleeving tube; a motor housing sealing gasket is arranged in the second groove, and the seventh annular baffle is arranged in the second groove and abuts against the motor housing sealing gasket.

14. The swimming pool fountain lamp according to claim 11, wherein the third sleeving tube is arranged in the first connecting tube, and the motor is arranged in the third sleeving tube; a plurality of tenth through holes are arranged circumferentially on the first housing, and the tenth through hole is in communication with the first connecting tube.

15. The swimming pool fountain lamp according to claim 11, wherein a motor sealing gasket is provided in the third sleeving tube, a first end of the motor sealing gasket abuts against the motor, and a second end of the motor sealing gasket abuts against the motor cover; the motor sealing gasket is provided with a protruding member, the motor cover defines an eleventh through hole, and a first end of the protruding member passes through the eleventh through hole and is arranged in the first connecting tube.

16. The swimming pool fountain lamp according to claim 15, wherein a twelfth through hole is defined on the protruding member, a first end of a motor shaft of the motor passes through the twelfth through hole and is arranged in the first connecting tube; the motor shaft of the motor is connected to a fan blade, and the fan blade is arranged in the first connecting tube.

17. The swimming pool fountain lamp according to claim 11, wherein the motor cover is arranged at a bottom portion of the third sleeving tube and is connected with the third sleeving tube through threads, and the second housing is provided with a PET sheet.

18. The swimming pool fountain lamp according to claim 1, wherein the upper housing and the lower housing are made of a light-transmitting material, and an inner wall of the lower housing is provided with polygonal patterns.

* * * * *